(12) United States Patent
Raghunath et al.

(10) Patent No.: US 7,376,084 B2
(45) Date of Patent: May 20, 2008

(54) METHOD AND APPARATUS OF PROVIDING RESOURCE ALLOCATION AND ADMISSION CONTROL SUPPORT IN A VPN

(75) Inventors: Satish Raghunath, Troy, NY (US); Kadangode K. Ramakrishnan, Berkeley Heights, NJ (US)

(73) Assignee: AT&T Corp., New York, NY (US)

(*) Notice: Subject to any disclaimer, the term of this patent is extended or adjusted under 35 U.S.C. 154(b) by 805 days.

(21) Appl. No.: 10/841,701

(22) Filed: May 7, 2004

(65) Prior Publication Data

US 2005/0068961 A1 Mar. 31, 2005

Related U.S. Application Data

(60) Provisional application No. 60/506,818, filed on Sep. 29, 2003.

(51) Int. Cl.
*H04L 1/00* (2006.01)
*H04L 12/26* (2006.01)

(52) U.S. Cl. ...................... 370/233; 370/253

(58) Field of Classification Search ............. None
See application file for complete search history.

(56) References Cited

U.S. PATENT DOCUMENTS

| | | | |
|---|---|---|---|
| 5,432,785 A | 7/1995 | Ahmed et al. | |
| 2004/0028054 A1* | 2/2004 | Khurana et al. | 370/395.21 |
| 2004/0165528 A1* | 8/2004 | Li et al. | 370/230 |

OTHER PUBLICATIONS

Dziong, Z. et al, "Virtual Network Concept and Its Applications for Resource Management in ATM Based Networks", Broadband Communications, Global Infrastructure for The Information Age, Proceedings of the International IFIP-IEEE Conference on Broadband Communications, Canada, 1996 London, Chapman and Hall, Apr. 23, 1996, pp. 223-234.

* cited by examiner

*Primary Examiner*—Chau Nguyen
*Assistant Examiner*—Hicham B Foud

(57) ABSTRACT

Method and apparatus for effectively supporting resource allocation and admission control of a Virtual Private Network in a service provider network.

2 Claims, 11 Drawing Sheets

METHOD AND APPARATUS OF PROVIDING RESOURCE ALLOCATION AND ADMISSION CONTROL SUPPORT IN A VPN

This application claims the benefit of U.S. Provisional Application No. 60/506,818 filed on Sep. 29, 2003, which is herein incorporated by reference.

The present invention relates generally to communication networks and, more particularly, to a method and apparatus of effectively supporting resource allocation and admission control of Virtual Private Networks in a service provider network.

BACKGROUND OF THE INVENTION

A Virtual Private Network (VPN) securely connects multiple customer sites that are possibly geographically spread out and wish to communicate among each other. Frequently, such a network provides a pre-specified Quality of Service assurance (a Service Level Agreement—SLA) in the form of expected loss rates and delays. A service provider provisions the network to ensure that the SLAs for an admitted VPN are met based on information provided by the VPN customer. The QoS achievable for a given VPN is influenced by the way customer sites are inter-connected by the provider. The most straightforward solution is to have a mesh of point-to-point links connecting customer sites. A more efficient and scalable solution would be to multiplex multiple VPN customers on a common core network that incorporates mechanisms to maintain an individual VPN's QoS through mechanisms of admission control, queuing and scheduling. While this option is far more scalable, the question of providing per-VPN QoS becomes harder. When aggregates from different VPN customers are multiplexed, the traffic distortions introduced are not easily quantified. These distortions can severely degrade the quality of service. However, with appropriate admission control mechanisms at the entry of the network combined with a core network capacity adjustment mechanism, the provider can meet the QoS requirements with much flexibility.

Therefore, a need exists for a method and apparatus to effectively support admission control and core network resource allocation of a customer VPN in a service provider network.

SUMMARY OF THE INVENTION

In one embodiment, the present invention addresses the VPN resource allocation problem featuring two complementary components—one, an edge provisioning problem, two, a core provisioning problem. Specifically, the edge problem features a port-assignment problem where one has to quantify the trade-off between the cost of backhaul distance to a provider edge versus the cost of increased routing table size. Simultaneously, the core provisioning involves sizing uplink capacities and designing backbone links to suit the particular port assignment at the edges. In a packet-oriented network the natural question is the extent to which core provisioning can exploit statistical multiplexing gains while honoring a given SLA.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

A typical admission control test involves deciding whether to admit a new flow into the network. The decision depends on whether existing contracts are violated, in which case the new flow cannot be admitted. When admitting a new customer VPN, the admission criterion has to account for traffic aggregates that will be introduced from all sites of the new VPN customer into the network. In this sense it involves multiple steps, each of which resembles a traditional admission control problem. But unlike the problem of admitting a new flow onto a link, one has to deal with point-to-multipoint nature of the traffic from each customer site.

Figure 1:
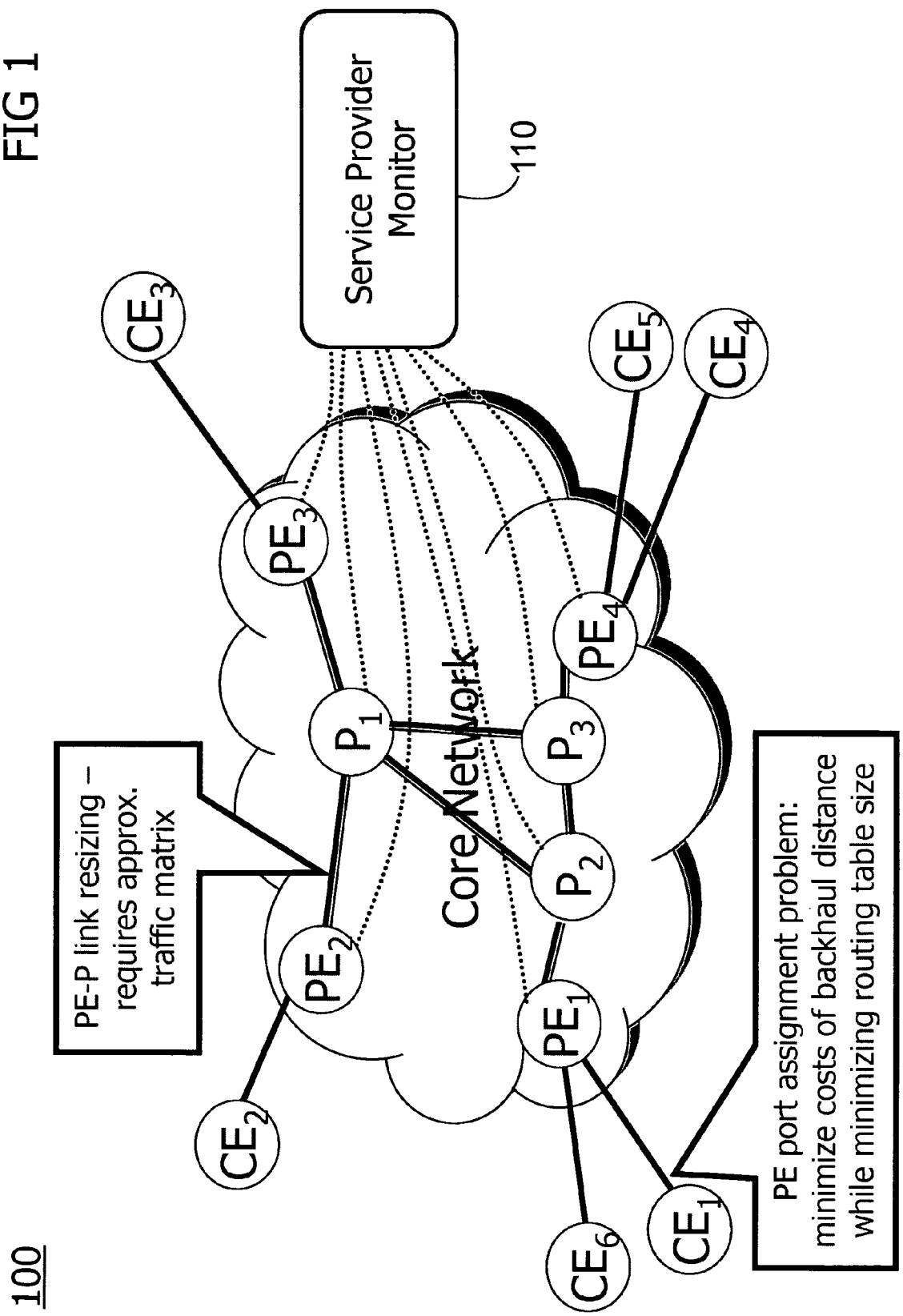
FIG. 1 illustrates a diagram of an exemplary VPN network with a plurality of customer endpoints CE1-CE4, a plurality of service provider edge equipment PE1-PE4, and a core network interconnecting the PE's.

To better understand the present invention, a description of the components of such a customer VPN network is provided below. FIG. 1 shows an exemplary communication network 100 of the present invention. Network 100 contains a plurality of customer endpoints CE1 to CE6, a plurality of service provider edge equipment PE1 to PE4, and a plurality of core network equipment P1 to P3.

Figure 2:
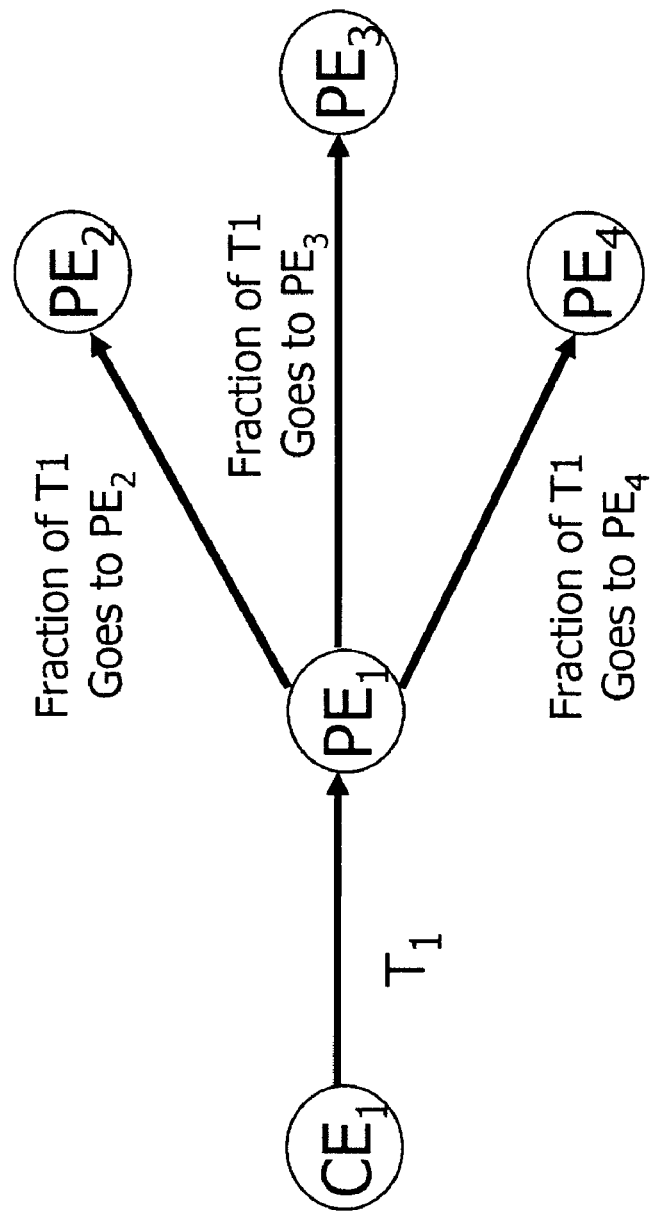
FIG. 2 illustrates an exemplary admission decision for the aggregate T1 split among a plurality of PE's.

Consider the example where it is necessary to decide whether to admit the VPN with endpoints CE1;CE2;CE3; CE4;CE5;CE6, as shown in FIG. 1. The provider edge routers corresponding to these endpoints are denoted as PE1; PE2; PE3; PE4. The traffic aggregate emanating from the network at CE1 possibly contains traffic toward CE2, CE3, CE4, CE5 and CE6. Consider the admission decision for the aggregate bandwidth of T1 as depicted in FIG. 2. There are two pieces of information that an admission control entity needs here:

1. A traffic matrix that provides statistics about traffic exchanged between CE1 and any of the other endpoints.

2. The capacity available between PE1 and any of the other network edges through which the customer endpoints are reached.

In an ideal situation, the customer traffic is perfectly characterized so that a traffic matrix is obtained that specifies the amount of traffic that is directed toward each of the other endpoints. Further, the network would support per-hop signaling-based admission control so that one has a precise idea of the capacity available to a given endpoint. However, neither of these pieces of information is easily available in a real situation. It is usually hard to obtain the customer's traffic matrix because it is often unknown even to the customer. Further, today's core networks do not support per-hop admission control functions. The question then becomes, what is the relative importance of these components and what mechanisms can help a provider go beyond a naïve peak provisioning approach while still being relevant from a deployment perspective. The service provider would naturally want to exploit the multiplexing gains offered by the temporal and spatial variability in the traffic generated by the endpoints of VPNs in the network. There are two levels of multiplexing that can be taken advantage of:

multiplexing of traffic from the endpoints of a given VPN sharing a part of the network multiplexing of traffic from different VPNs sharing the network To address these problems, the present invention provides a method and apparatus of providing edge network admission control and core network resource allocation of a customer VPN being admitted into a service provider network.

The present invention uses an optimization-driven edge provisioning strategy coupled with data-driven analysis of the core network problem to address issues regarding VPN admission control and the nature of SLAs and statistical multiplexing gains that are achievable in a single unified framework. The optimization component ensures that customers are assigned to provider edge router (PE) ports so as to achieve the best trade-off between the cost of longer backhaul distances and higher routing table sizes. The coupling with the core provisioning means that the SLA promised to customer is maintained while the provider's objectives are optimized. In addition to maintaining the SLA, the core provisioning based on optimal sizing of uplink and backbone links implies that maximal statistical multiplexing gains can be exploited.

FIG. 1 shows a key component of the present invention, the Service Provider Monitor (SPM) 110, which is logically a single service provider monitoring and decision making entity. The SPM continuously collects SNMP data using a timescale, e.g., in the order of 5-minute intervals from all the different routers, including both the edge routers, PE's, and the core routers, P's. The SNMP data collected from all the routers include traffic statistics as well as topology information of the service provider network. The collected data are then used over a longer timescale, e.g., in the order of hours or days to obtain the available capacity within the service provider network. In addition, the collected data can then be used as inputs into the "gravity model" to derive the traffic matrix for each customer VPN. Moreover, the gravity model accuracy to derive traffic matrices can be enhanced when there is additional information about the network. The entropy model for traffic matrix estimation incorporates the gravity model in a penalized least-squares estimation formulation to deliver more accurate estimation. The SPM 110 helps the deriving of the actual traffic load, both the mean and standard deviation of the traffic coming in from each CE to each PE for each customer, placed on the service provider network. The SPM can use the derived information to do the following:

If the prediction of the customer load during admission control is too low, the information about the customer traffic load, traffic matrix, and the available capacity in the network can be used to re-size the overloaded links, both PE-to-P and P-to-P links, within the network;

The information on available capacity in the network collected by the SPM can be distributed to all the PE's in the network; in turn, each PE can use the distributed information to make edge based admission control decision.

There are two different ways to perform edge based admission control by a PE using the distributed information from the SPM:

The PE's can perform admission control with specification only of peak hose capacity requirements from the customer without providing the traffic matrix. This admission control decision operates on a much faster timescale, whenever customer requests arrive, than the time scale that SPM operates; or Alternatively, as the preferred embodiment of the present invention, the PE's or a provisioning tool that has the knowledge of where the customer endpoints are going to be provisioned into the network can request the SPM, which has information on the multiple endpoints, for guidance on the admission control decision for the customer VPN request. The information supplied to the SPM will be peak hose capacity requirements from the customer without providing the traffic matrix. The provisioning tool can also run an optimization algorithm optimizing routing table size against backhaul distance to first determine which set of PE's will be used to satisfy a customer request before asking the SPM for guidance. The SPM uses its estimate of the current available capacity in the network, the path from PE to PE given its knowledge of the network topology, and the peak hose requirements to arrive at an admission control decision. This decision is then provided back to the PE's so that the admission decision made by the SPM can be executed by the PE's.

The gravity model to derive traffic matrices can be made more accurate when there is additional information about the network. The entropy model for traffic matrix estimation incorporates the gravity model in a penalized least-squares estimation formulation to deliver more accurate estimation. The formulation can be specified as:

$$\operatorname{Min}_x\{\|y-Ax\|^2 + \lambda^2 \Sigma_{\{k:g_k>0\}} x_k/T \log(x_k/g_k)\}$$

Here, the variables have the following meaning:

x—vector of traffic matrix variables such that $x_i$ indicates the traffic from source $s_j$ to destination $d_k$ y—vector of link traffic measurements such that $y_i$ indicates the traffic on link i.

A—a routing matrix indicating which variables $x_i$ sum together to a given $y_i$.

λ—a small real number g—a vector of traffic matrix estimates computed using the Gravity Model.

T—the total traffic in the network

To understand the intuition behind this formulation, consider the following. The formulation minimizes a sum of two quantities—first, a measure of squared error in estimation as compared to measurement; second, a proportion of the estimate to the gravity model. Observe that the sum can be reduced by either reducing the squared error or by reducing the difference from the gravity estimate. In essence, the optimization is striking the best balance between these two options—finding the assignment which is as close as possible to the gravity estimate while minimizing the squared error from measured data.

The formulation stated above featured measurements for all links and variables associated with all contributing nodes. In the case of VPNs such a formulation quickly becomes computationally unwieldy. There is a need to adapt this model so that essential insights are retained while the scale of the formulation is reduced. In order to achieve this goal, an examination of the structural characteristics distinct to the problem is performed.

Figure 10:
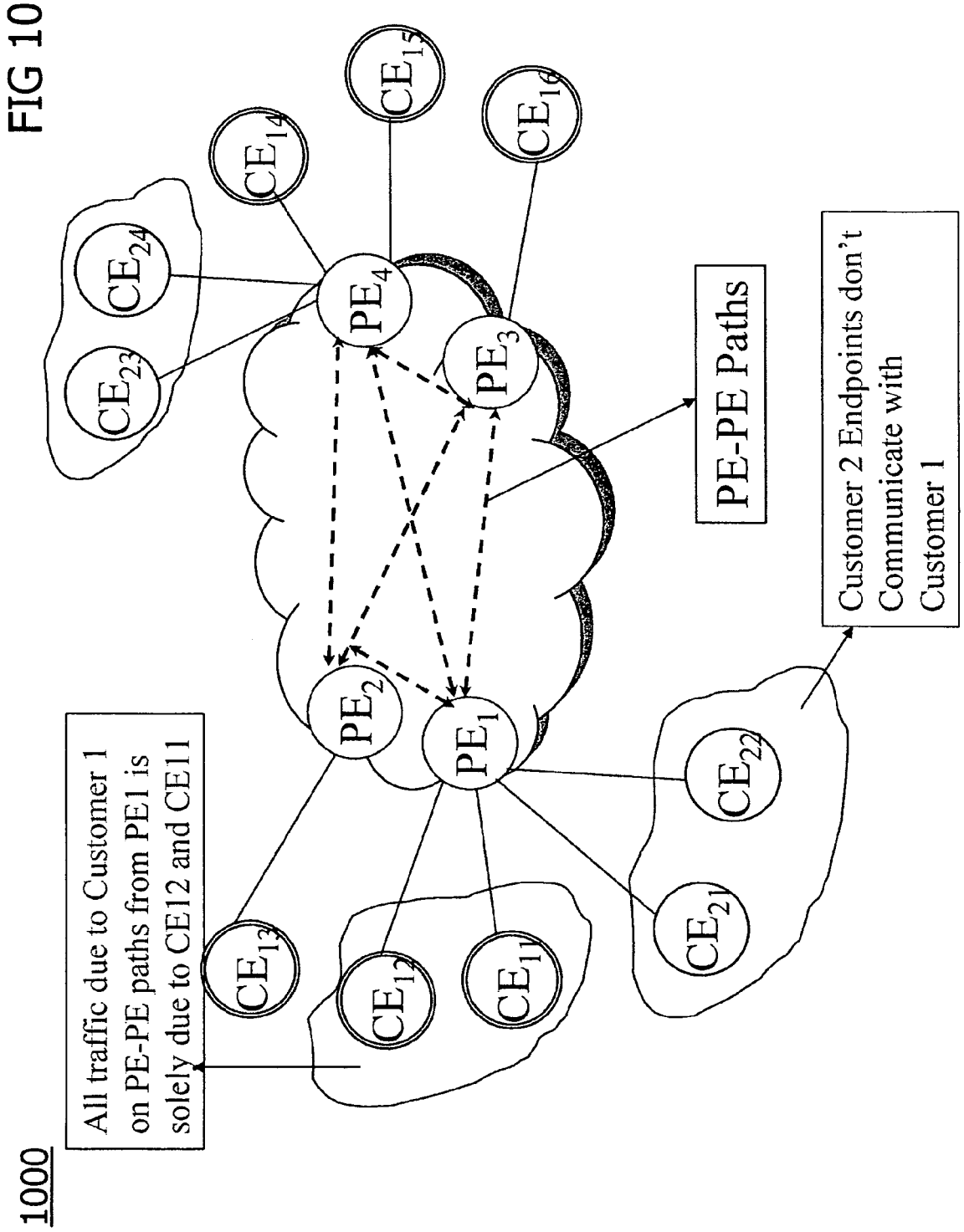
FIG. 10 illustrates a diagram of an exemplary VPN network with a plurality of customers, a plurality of customer endpoints CE11-CE16 and C21-CE24, a plurality of service provider edge equipment PE1-PE4, and a core network interconnecting the PE's.

The first important observation is that endpoints in a VPN communicate within the VPN and not with any endpoint outside the VPN. In FIG. 10, two customers are illustrated sharing a core network. The endpoints of customer 1 (indicated by $CE_{11}$, $CE_{12}$ etc.) do not communicate with $CE_{21}$, $CE_{22}$ etc. This means that the traffic matrix formulation for the network can be broken down and solved on a per-VPN basis, so long as the information about the traffic on various links due to a given VPN is available. For example, the formulation discussed above for Customer 1 alone can be constructed if the present invention has the information about the traffic due to Customer 1 on all the relevant links, viz., (a) the links between $CE_{1x}$ and $PE_y$, and (b) on the paths between $PE_x$ and $PE_y$. Existing measurement information contains aggregate traffic information for all links. Since the links between $CE_{1x}$ and $PE_y$ are used by Customer 1 alone, the present invention has the information specified by (a). However the aggregate measurement data for paths between $PE_x$ and $PE_y$ is representative of data due to all VPNs using the path between $PE_x$ and $PE_y$.

In order to obtain the information specified by (b), an approximation can be made. An upper-bound on the contribution of this customer to the traffic measured along a path between $PE_x$ and $PE_y$ can be found. To do this, the total contribution of Customer 1 to a given $PE_x$-$PE_y$ path is observed and is dependent only on the amount of traffic offered by the endpoints of Customer 1 that are connected to $PE_x$ and $PE_y$. Referring to FIG. 10, the contribution of Customer 1 to the path between $PE_1$ and $PE_3$ is only due to $CE_{11}$, $CE_{12}$ and $CE_{16}$. Thus the sum of traffic going out from $CE_{11}$ and $CE_{12}$ serves as an upper-bound on the contribution of Customer 1. So the equations that account for the bytes along the path between $PE_1$ and $PE_3$ are changed to reflect this:

$$T(PE_1, PE_3) = TM(CE_{12}, CE_{16}) + TM(CE_{11}, CE_{16}) + v'$$

Here, TM(k,j) is the traffic matrix variable that represents the amount of traffic that endpoint k communicated to j and is the quantity for which is being solved. The term v' is a variable introduced to indicate that the constant on the left hand side is greater than or equal to the sum of TM variables. Hence it is a dummy variable representing the contribution of all other VPNs to the $PE_1$-$PE_3$ path. This equation can be further refined by observing that the $T(CE_{11})+T(CE_{12})$ is the maximum observable traffic on the $PE_1$-$PE_3$ path due to Customer 1. Thus the following equation can be obtained:

$$\min(T(CE_{11})+T(C_{12}), T(PE_1, PE_3)) = TM(C_{12}, C_{16}) + v'$$

Now, v' represents the part of $T(CE_{11})+T(CE_{12})$ that does not traverse the link between $PE_1$ and $PE_3$.

Thus the new formulation adds one variable for each PE-PE path. Now, this formulation computes traffic matrices for each VPN independently of other VPNs and hence drastically reduces the computation scale of the problem.

Figure 11:
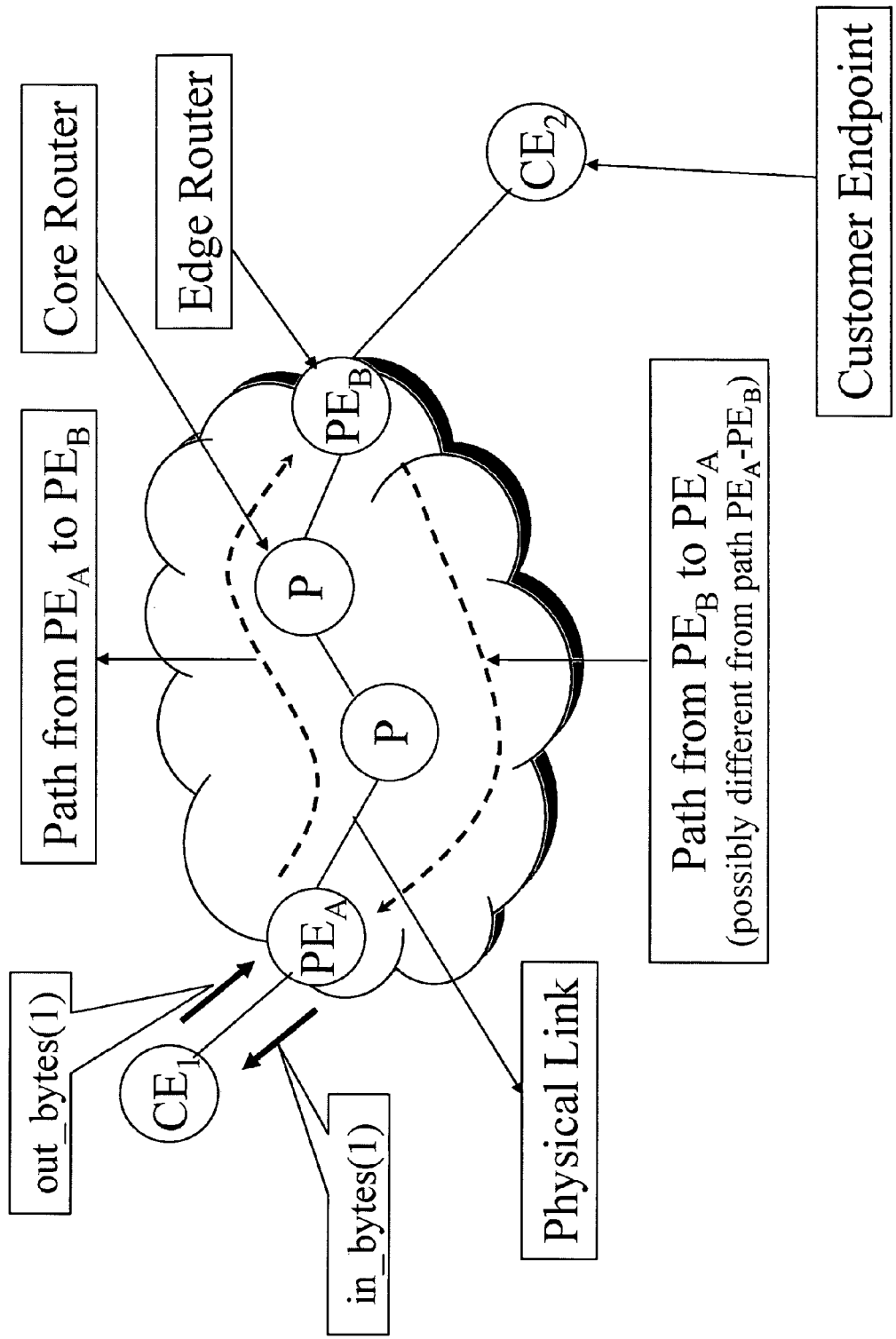
FIG. 11 illustrates a diagram of the definition of a PE-PE Path between 2 PE's, $PE_A$ and $PE_B$.

An admission decision is based on whether the additional traffic offered by the new VPN can be accommodated by the available capacity between every pair of PEs affected by this VPN. Thus every pair of PEs is associated with a quantity termed the PE-PE capacity that indicates the amount traffic that can be carried between that pair. An analogy can be drawn to a pair of nodes connected by a "logical" link of a given capacity and say that there exists a PE-PE path of a given capacity. Thus the term PE-PE path is used to mean a logical link between a pair of PEs with a particular capacity. The routing and traffic engineering modules decide the route that connects the given pair of PEs. The admission entity only relies on the capacity associated with the pair of PEs. FIG. 11 illustrates the concept of a PE-PE path between edge router $PE_A$ and edge router $PE_B$ through a network or core routers, P's, within the network. Thus the traffic engineering entity is free to alter the route connecting a pair of PEs so long as the capacity remains the same or higher.

Once the admission decision is made, the aforementioned SPM monitoring capability can be used to correct any admission control errors, especially in the case that the prediction of customer load has been too low.

Figure 8:
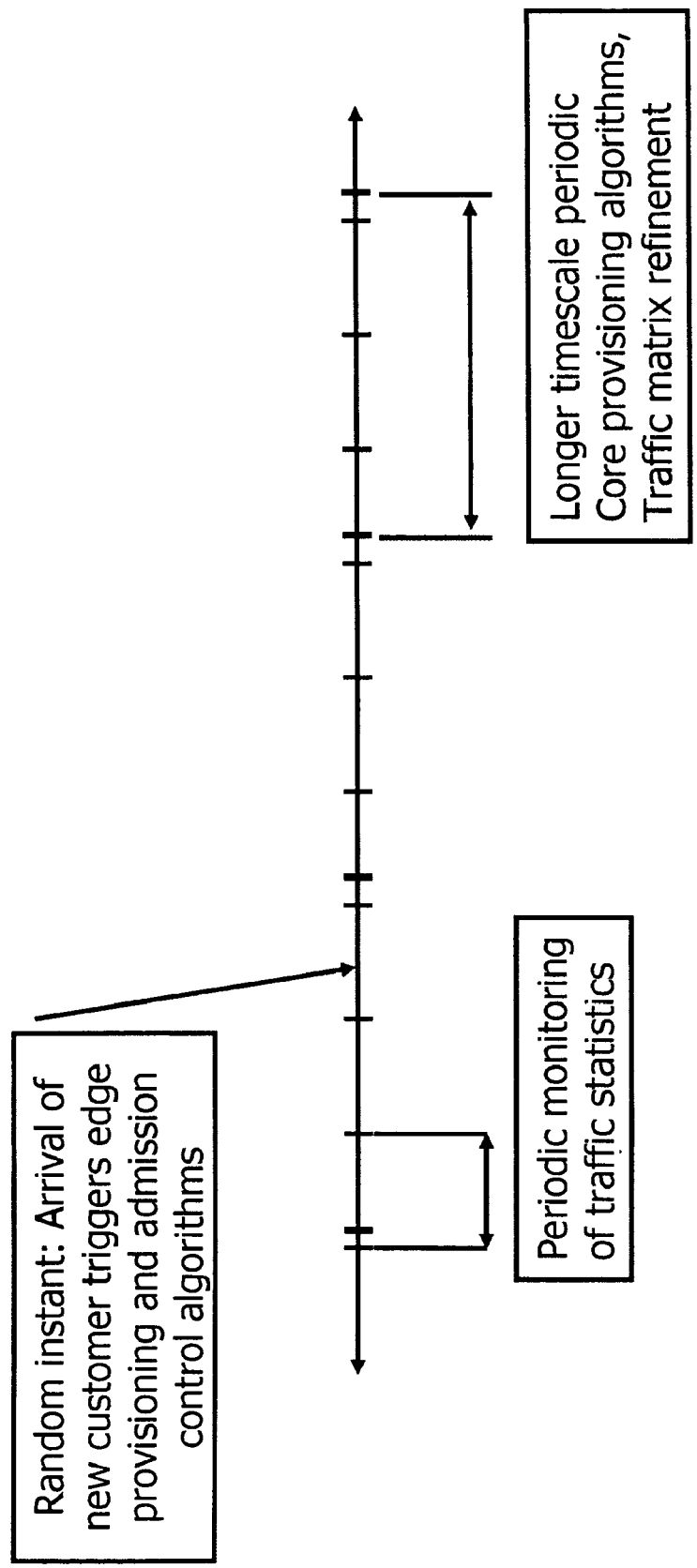
FIG. 8 illustrates a diagram of the timescale relationships among various events related to the present invention.

FIG. 8 provides an overall timescale diagram of different key operations performed within the network. Periodic monitoring of traffic statistics and topology is performed at an interval in the order of 5-minute or so. Derived available capacity information and traffic matrix information from the "gravity model" by the SPM is used at an interval in the order of hours or days to re-size overloaded core network links (i.e., on the PE-PE path) and refine traffic matrix information. While these operations are on-going, a new customer request can arrive at any instant to trigger an edge provisioning and admission control related tasks to be performed.

Figure 3:
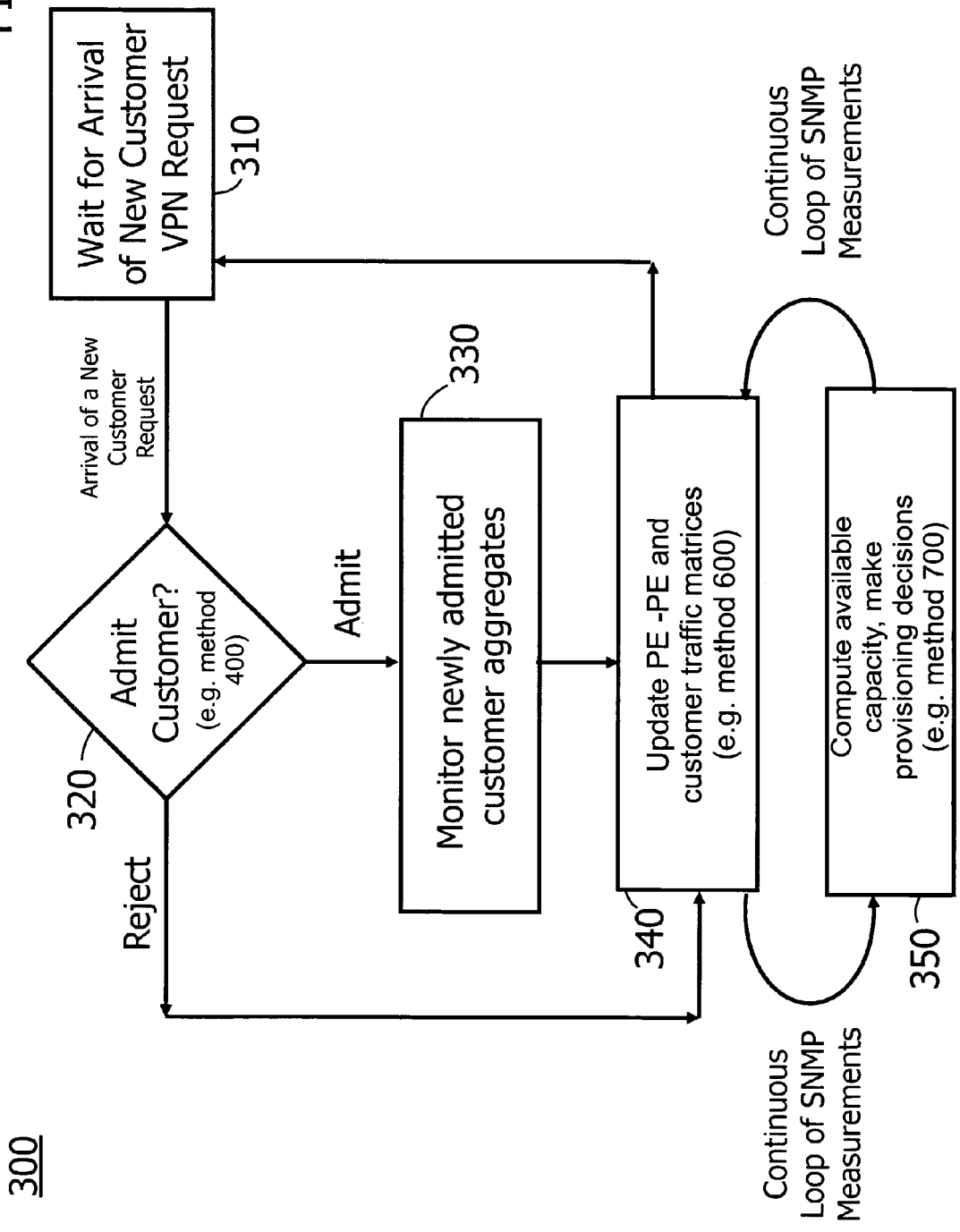
FIG. 3 illustrates a flowchart of a method for admission control and resource allocation of a VPN into a service provider network.

FIG. 3 illustrates a flowchart of the overall method 300 for admission control and resource allocation of a VPN into a service provider network. Method 300 starts in step 310.

In step 310, upon the arrival of a new customer VPN add request to be added to the service provider network, the method proceeds to step 320. In step 320, the method makes a decision whether to admit the VPN add request or not. Step 320 can be further divided into sub-steps shown in method 400 in FIG. 4. If there is inadequate resource to admit the VPN add request, the method proceeds to step 340; otherwise, the method proceeds to step 330. In step 330, the newly admitted customer traffic aggregates will begin to be monitored by the SPM. Then the method proceeds to step 340.

Steps 340 and 350 form a continuous loop as part of the longer timescale PE to PE line measurement background activity performed by the SPM. This loop will be temporarily interrupted whenever a new customer VPN request arrives so that the data structures updated by these steps will take into account of the arrival of a new customer VPN and new measurement targets will be added when necessary. The interruption of this loop is represented by the flow from step 320 to step 340 and then back to step 310 when a decision to reject a customer admission request is made and the flow of step 330 to step 340 and then back to step 310 when a decision to accept a customer admission request is made.

In step 340, the PE to PE and CE traffic matrices are updated accordingly. Step 340 can be further divided into sub-steps shown in method 600 in FIG. 6. The method then proceeds to step 350 in which available capacity is computed and provisioning decisions are made to perform adjustment to appropriate links within the network. Step 350 can be further divided into sub-steps shown in method 700 in FIG. 7. Once step 350 is done, the method proceeds back to step 340 as part of a continuous execution loop.

Figure 4:
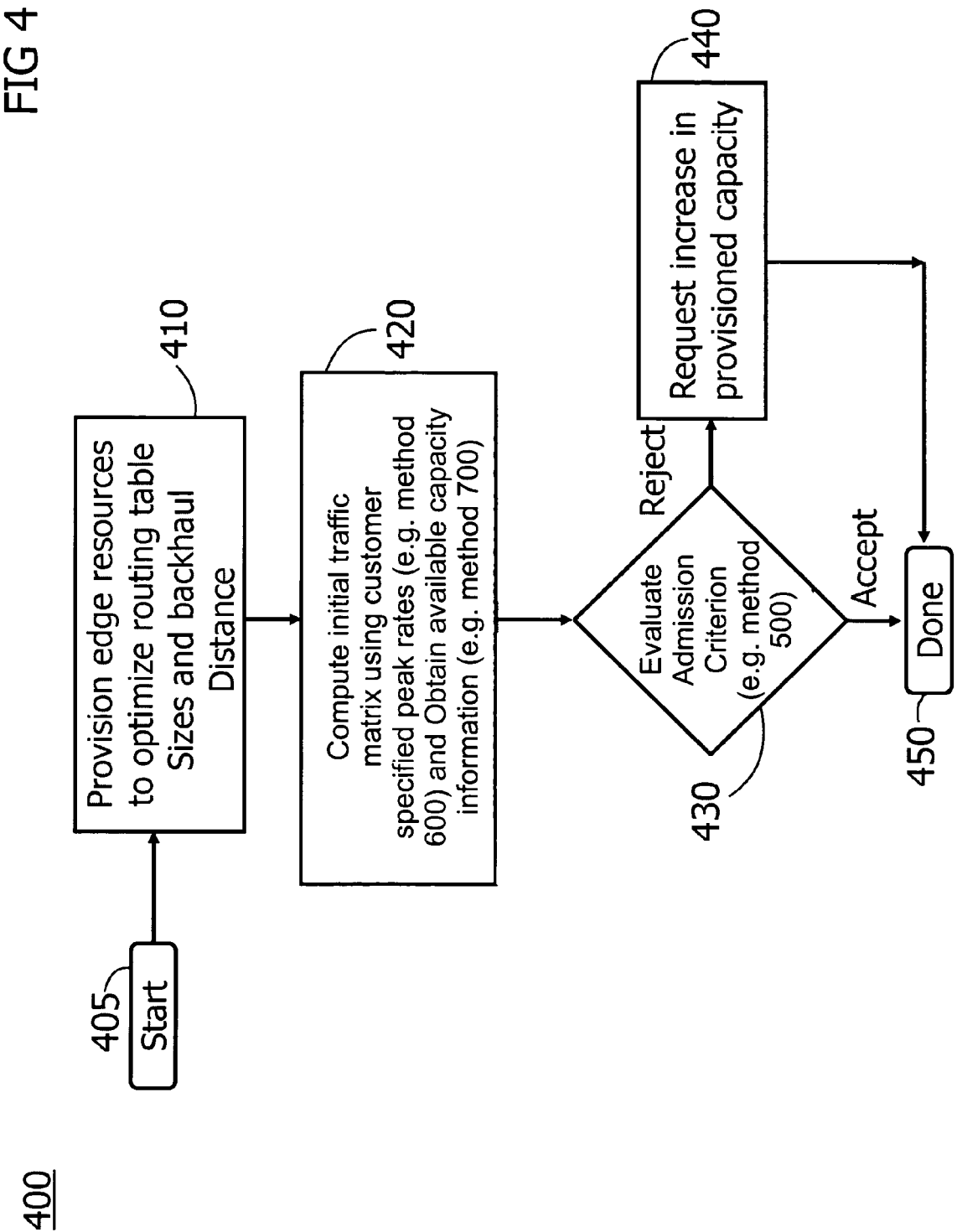
FIG. 4 illustrates a flowchart of a method for customer VPN admission.

FIG. 4 illustrates a flowchart of a method 400 for customer VPN admission. Method 400 starts in step 405. In this method, the information supplied to the SPM will be peak hose capacity requirements from the customer without providing the traffic matrix. An optimization algorithm is run to optimize routing table size against backhaul distance to first determine which set of PE's will be used to satisfy a customer request before asking the SPM for guidance. The SPM uses its estimate of the current available capacity in the network, the path from PE to PE given its knowledge of the network topology, and the peak hose requirements to arrive at an admission control decision.

In step 410, edge resources will be provisioned based on the optimization of routing table sizes versus backhaul distance. One example of the pseudo code of the optimization algorithm is provided below.

```
set customers;
set endpoints{customers};
set p_edges;
param pe_cap{p_edges};
# The required bandwidth for a customer endpoint
param capacity{i in customers, endpoints[i]};
# Contribution of customer to the routing table
param routesize{customers};
# Distance of customer endpoint to every PE
param distance{p_edges,i in customers,endpoints[i]};
# Distance of customer endpoints to the PE it is currently
# homed -- obtained from ICORE database
param curr_dist{i in customers, endpoints[i]};
param curr_clustersize {customers};
# Higher the value of w1 more important is the cost of distance
param w1;
# Higher the value of w2 more important is the cost of
# routing table size
param w2;
# A measure of risk increase with multiple endpoints of a customer
# homed on the same PE
param w3;
# Compared to existing assignment, don't want distance to
# PE to increase beyond a factor of w4
param w4;
# A 3-d table of 0-1 variables, X[i,j,k] is 1 if endpoint k
# of customer j is homed into PE i
var X {p_edges,i in customers,endpoints[i]} binary;
# The maximum routing table size across all PEs
var rmax;
# A table indicating whether a customer has some endpoint
# homed in on a given PE.. for all customer endpoints homed
# into a PE, the contribution to the routing table is 1 unit.
var Xk_max {p_edges,customers} binary;
# Objective: minimize the weighted sum of costs
minimize obj1: sum {i in p_edges, j in customers, k in endpoints[j]}
w1*distance[i,j,k] * X[i,j,k] + w2*rmax;
# Subject to: even distribution of routing table sizes
# and reduction of risk
subject to rou1 {i in p_edges}: rmax >= sum{j in customers}
(Xk_max[i,j] * routesize[j]) ;
# Linear constraint to find Xk_max
subject to rou2 {i in p_edges, j in customers, k in endpoints[j]}:
Xk_max[i,j] >= X[i,j,k];
# Number of customers homed into PE should be in line
# with PE capacity
subject to cap {i in p_edges}: pe_cap[i] >= sum {j in customers, k in
endpoints[j]} X[i,j,k]*capacity[j,k] ;
# All customer endpoints must be assigned to some PE
# subject to asgn
{i in customers, j in endpoints[i]}:
        sum {k in p_edges} X[k,i,j] = 1;
# Prune the search space -- with reference to the existing
# assignment of endpoints, don't want the new assignment to
# increase distance to PE by more than a factor of w4
subject to dist {i in customers, j in endpoints[i], k in p_edges}:
```

-continued

```
X[k,i,j]*distance[k,i,j] <= w4*curr_dist[i,j];
subject to risk {i in p_edges, j in customers}:
    sum {k in endpoints[j]} X[i,j,k] <= curr_clustersize[j] ;
```

In step 420, the initial traffic matrix of a customer VPN will be computed based on customer specified peak rates and the available capacity information collected by the SPM will also be obtained. In step 420, given that initially the customer VPN traffic matrix is not available, the peak traffic rate information provided by the customer can first be used as inputs to method 600 to form an initial estimate of the customer VPN traffic matrix. Then, the network starts obtaining available capacity information for the newly added customer VPN as specified in method 700. Once step 420 has been executed, the continuous loop in method 300, between step 340 and step 350, will appropriately update the customer VPN traffic matrix information using method 600 and 700 on a continuous basis.

In step 430, the admission criterion will be evaluated to result in either accepting or rejecting the customer VPN. Step 430 can be further divided into sub-steps shown in method 500 in FIG. 5. If the admission request is accepted, the method terminates in step 450; otherwise, the method proceeds to step 440. In step 440, an increase in provisioned capacity will be requested to accommodate the VPN admission request. When step 440 has been done, the method will terminate in step 450.

Figure 5:
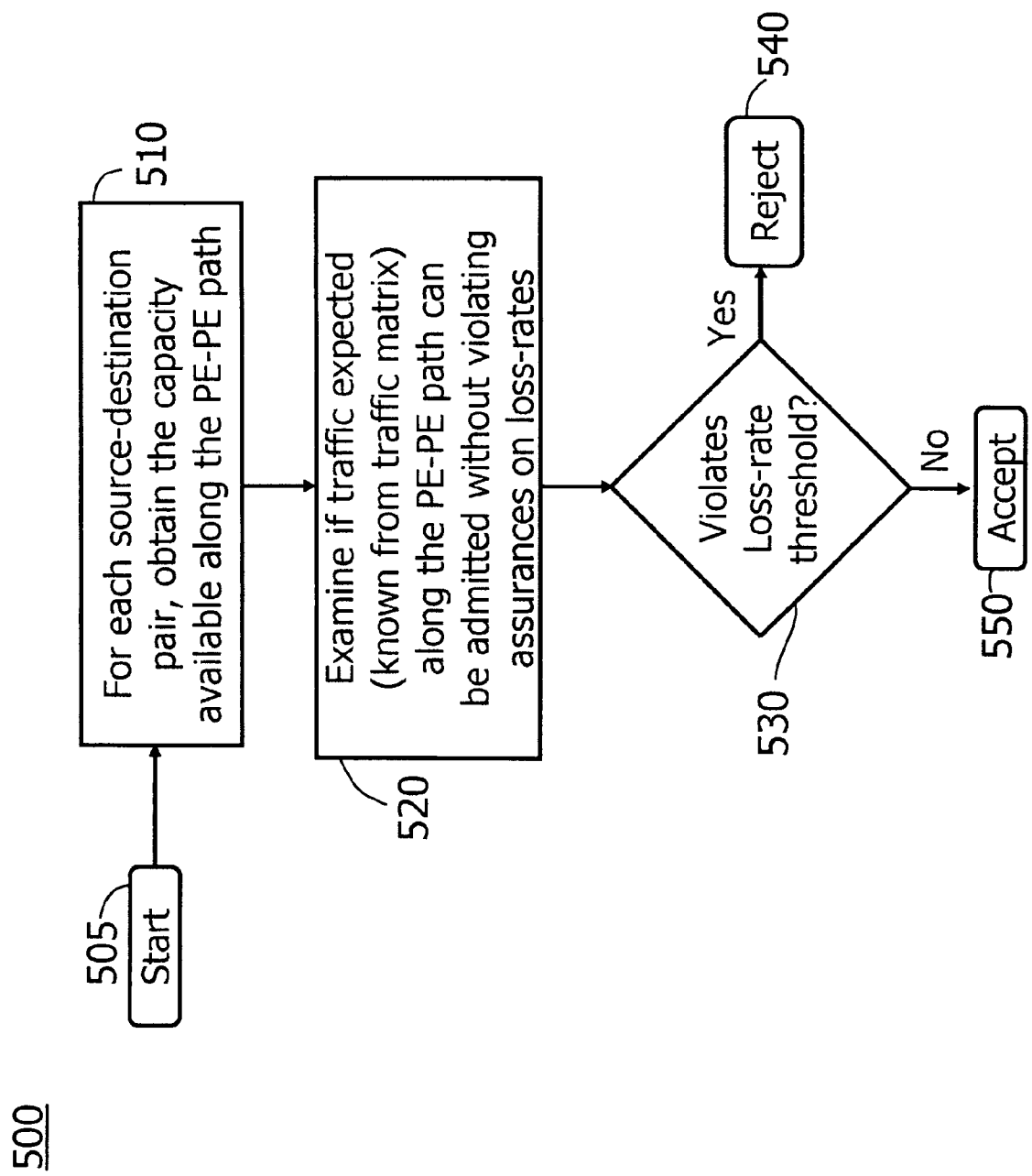
FIG. 5 illustrates a flowchart of a method for customer VPN admission control criterion.

FIG. 5 illustrates a flowchart of a method 500 for customer VPN admission control criterion. Method 500 starts in step 505. In this method, the SPM uses its estimate of the current available capacity in the network, the path from PE to PE given its knowledge of the network topology, and the peak hose requirements to arrive at an admission control decision.

In step 510, the method will obtain the capacity available along each PE-PE path. In step 520, the customer traffic expected, known from the traffic matrix, along the PE-PE path can be admitted without violating the loss rate assurances will be examined. In step 530, if the loss-rate threshold will be violated, then the method will proceed to reject the admission request in step 540; otherwise, the method will proceed to accept the admission request in step 550.

Figure 6:
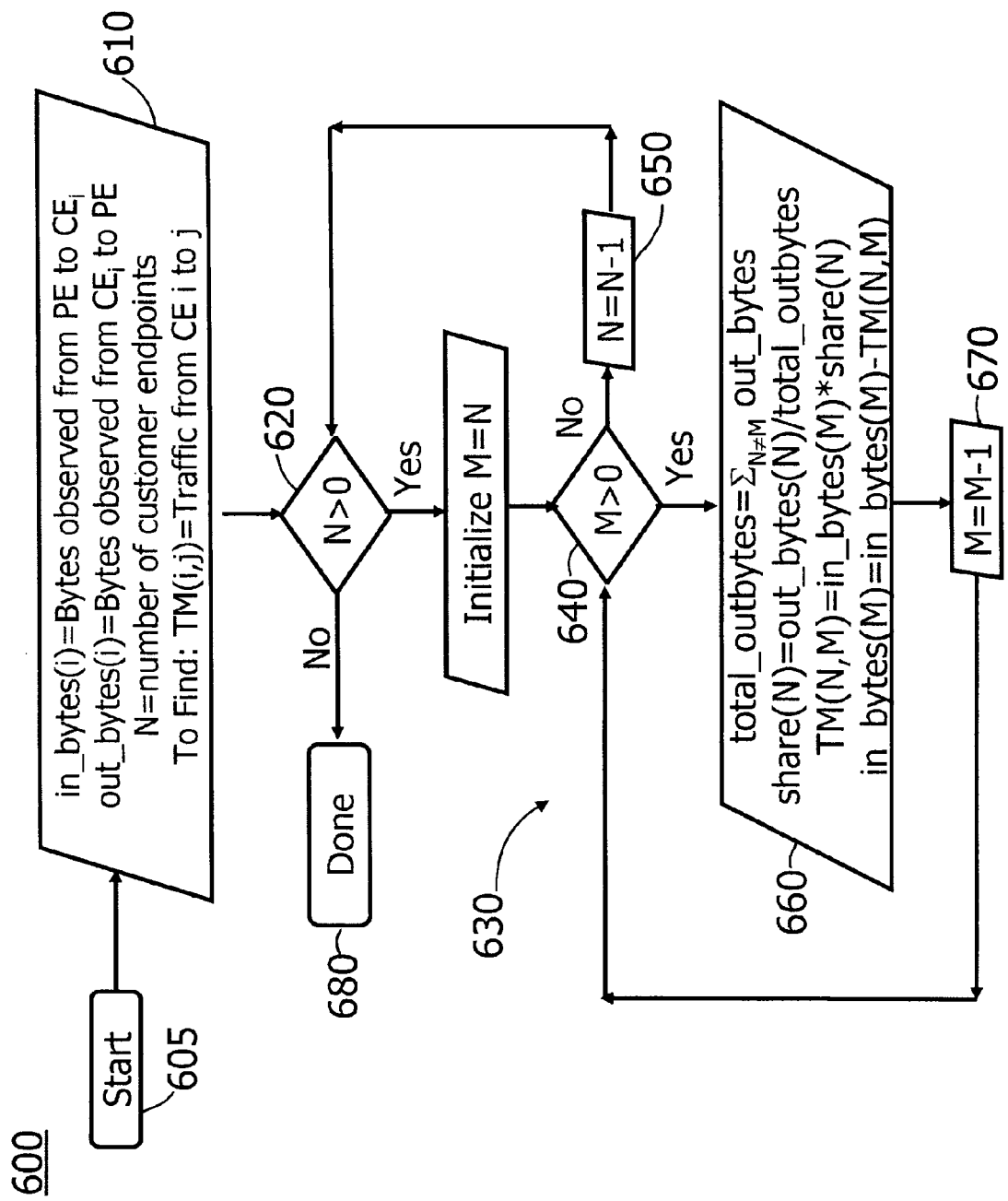
FIG. 6 illustrates a flowchart of a method for customer VPN traffic matrix computation.

FIG. 6 illustrates a flowchart of a method 600 for customer VPN traffic matrix computation. Method 600 starts in step 605. In this method, the "gravity model" is used to derive customer traffic matrix using data collected by the SPM over the shorter timescale operation. This method tries to approximately derive the contribution of every other CE toward the total traffic received by this CE from the PE. FIG. 11 illustrates an example that for CE1, this method will derive the contribution of traffic by CE2 sent through the network via PE1 toward CE1. Thus, if the present invention is executing this method for $CE_1$, it is trying to find out the number of bytes $CE_j$ sent to $CE_1$ for all $j \neq 1$. The variable share(N) is attempting to find the fraction of total traffic received by $CE_1$, from all other endpoints of the VPN, to be attributed to some $CE_N$. The fraction is being computed using a popular model known as the "gravity model", widely applied in transportation networks (e.g., to estimate the fraction of people arriving to NYC from another given city). The term "gravity" refers to the fact that more bytes are attributed to a CE which pours in more traffic into the network (much like how the gravitational pull is more for a body of higher mass). Once share(N) is estimated, it indicates the fraction of total traffic, received by $CE_1$, from all other endpoints, that can be attributed to $CE_N$. At the end of the procedure, the present invention has a traffic matrix that indicates the traffic from a given CE to any other CE.

In step 610, the aggregate traffic in octets from a PE to $CE_i$, in_bytes(i), as well as from $CE_i$ to a PE, out_bytes(i), are observed for all i in the customer VPN. FIG. 11 illustrates the direction of in_bytes and out_bytes in reference to a CE and a PE. In_byte refers to the number of bytes sent in the direction from a PE to a CE, while out_byte refers to the number of bytes sent in the direction from a CE to a PE. The variable N is set to the number of customer endpoints in the customer VPN. In step 620, if N is greater than 0, then the method proceeds to step 630; otherwise, the method terminates in step 680. In step 630, the variable M is set to, N, the number of customer endpoints in the VPN. In step 640, if M is greater than 0, then the method proceeds to step 660; otherwise, the method proceeds to step 650 to decrement N by 1 and then further proceeds to step 620. In step 660, the total number of out_bytes, total_outbytes, for all M<>N is summed. Then, the parameter share(N) is derived by calculating out_bytes(N)/total_outbytes. The parameter total_outbytes is defined to be the total of out_bytes for M<>N. Then, the traffic metric T(N,M) can be populated by calculating in_bytes(M)*share(N). Then, in_bytes(M) is decremented by the value of TM(N,M). Then the method proceeds to step 670. In step 670, M is decremented by 1 and then the method proceeds to step 640.

Figure 7:
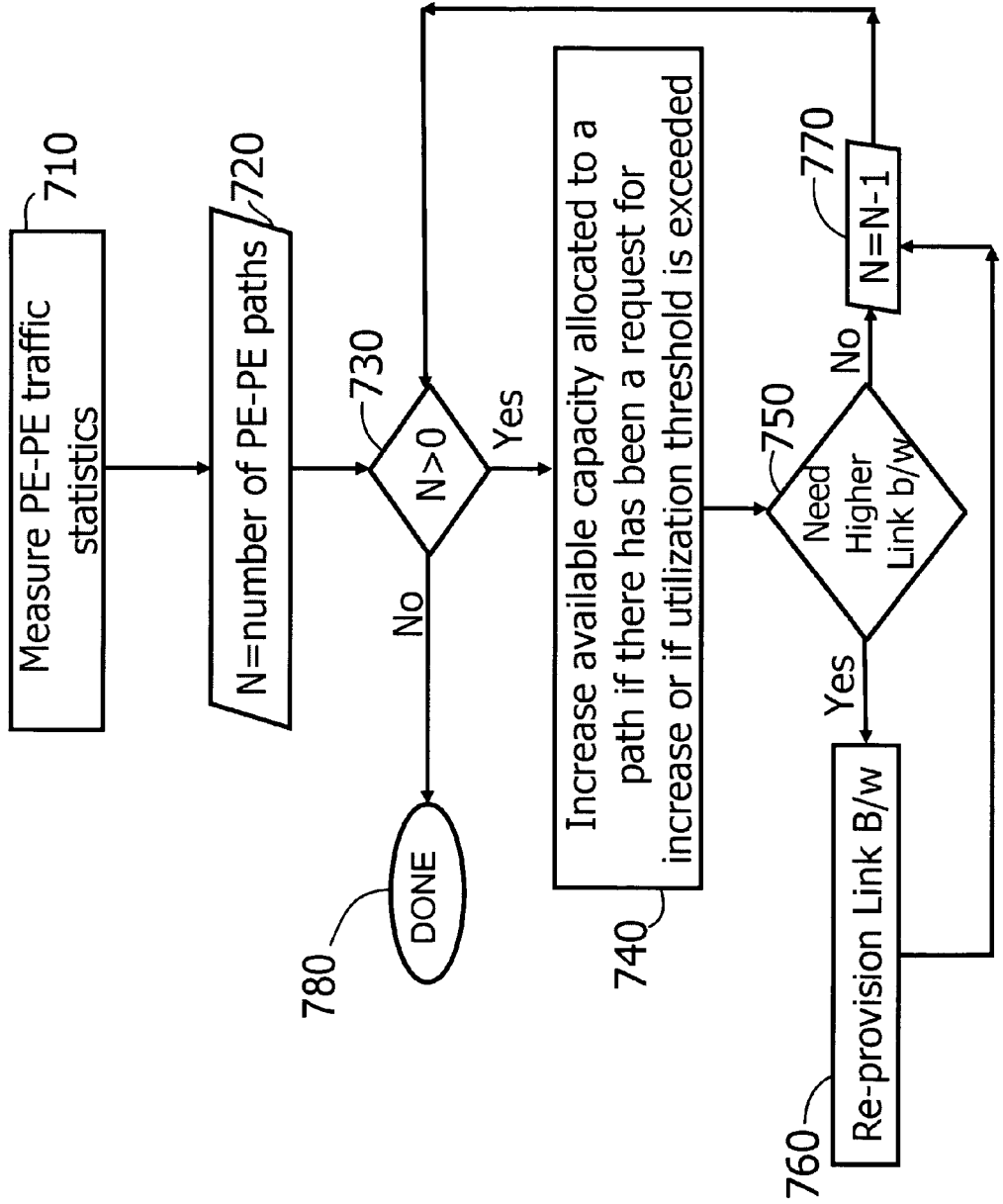
FIG. 7 illustrates a flowchart of a method for the core network provisioning to support the customer VPN request.

FIG. 7 illustrates a flowchart of a method 700 for the core network provisioning to support the customer VPN request. Method 700 starts in step 705. This method represents the continuous longer timescale SPM monitoring capability that is used to correct any admission control errors, especially in the case that the prediction of customer load has been too low, by re-sizing overloaded network links when necessary.

In step 710, the PE-PE traffic statistics will be measured. In step 720, the variable N will be set to be the number of PE-PE paths needed to support the VPN request. As previously defined, a PE-PE path is the logical link between a pair of PEs with a particular capacity. In step 730, if N>0, then the method proceeds to step 740; otherwise, the method terminates in step 780. In step 740, the available capacity allocated to a PE-PE path will be increased if there has already been a request for capacity increase (i.e. from step 440) or if the utilization threshold has been exceeded. In step 750, if a higher link bandwidth is needed to support the capacity increase, then the method proceeds to step 760 to re-provision the link bandwidth and then to step 770 to decrement the variable N; otherwise, the method proceeds directly to step 770 to decrement the variable N. The method then proceeds to step 730.

Figure 9:
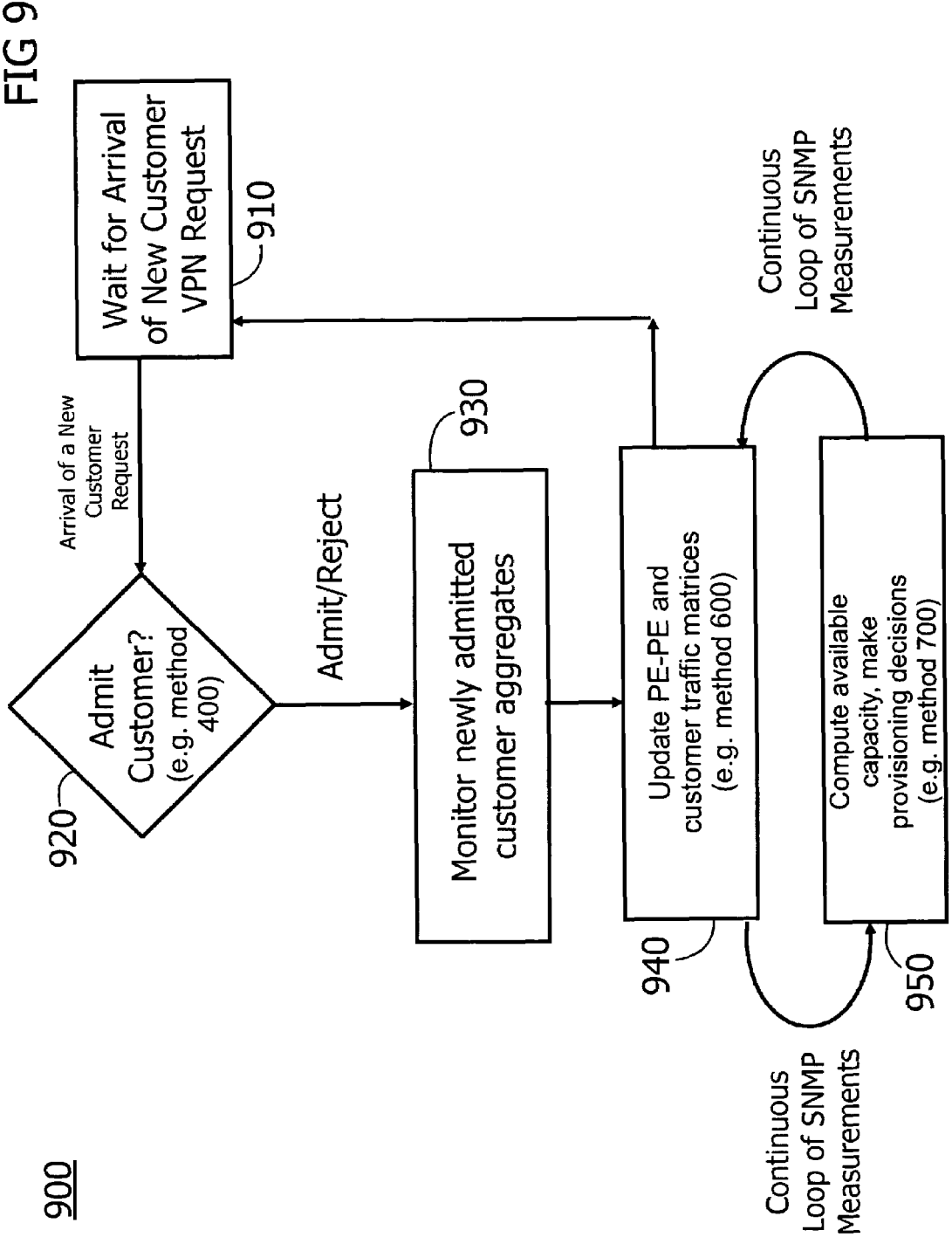
FIG. 9 illustrates a flowchart of the variation of a method for admission control and resource allocation of a VPN into a service provider network.

FIG. 9 illustrates a flowchart of the overall method 900 as a variant to method 300 for admission control and resource allocation of a VPN into a service provider network. Method 900 starts in step 910. This variant provides the flexibility to admit and monitor the customer end-point load of a customer VPN add request even when there is not enough capacity to meet the SLA requirements initially. Since the SPM continuously adjusts the network link capacity when there are overload conditions, in the order of hours or days, based on collected data done through constant monitoring, the SLA objective of the newly added VPN that cannot be met initially will be met sometime later through the adjustments made by the SPM anyway.

In step 910, upon the arrival of a new customer VPN add request to be added to the service provider network, the method proceeds to step 920. In step 920, the method makes a decision whether to admit the VPN add request or not. Step 920 can be further divided into sub-steps shown in method 400 in FIG. 4. Whether there is adequate resource to admit the VPN add request or not, the method proceeds to step 930 to admit the new VPN regardless of the decision made in step 920. In other words, even if the decision in method 400 is to reject the admission of the new VPN in the network, the method proceeds to admit the new VPN add request anyway.

Steps 940 and 950 form a continuous loop as part of the longer timescale PE to PE path available capacity measurement background activity performed by the SPM. This loop will be temporarily interrupted whenever a new customer VPN request arrives so that the data structures updated by these steps will take into account the arrival of a new customer VPN and new measurement targets will be added when necessary. The interruption of this loop is represented by the flow from step 920 to step 940 and then back to step 910 when a decision to reject or to admit a customer admission request is made.

In step 940, the PE to PE and CE traffic matrices are updated accordingly. Step 940 can be further divided into sub-steps shown in method 600 in FIG. 6. The method then proceeds to step 950 in which available capacity is computed and provisioning decisions are made to perform adjustment to appropriate links within the network. Step 950 can be further divided into sub-steps shown in method 700 in FIG. 7. Once step 950 is done, the method proceeds back to step 940 as part of a continuous execution loop.

Furthermore, the present VPN admission and resource allocation methods can be represented by one or more software applications (or even a combination of software and hardware, e.g., using application specific integrated circuits (ASIC)), where the software is loaded from a storage medium, (e.g., a ROM, a magnetic or optical drive or diskette) and operated by the CPU in the memory of a general computer system. As such, the present admission and resource allocation methods and data structures of the present invention can be stored on a computer readable medium, e.g., RAM memory, ROM, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for performing resource allocation and admission control of Virtual Private Networks (VPNs) in a communications network with a plurality of customer endpoints and a plurality of provider edge routers, said method comprising:

receiving a new customer VPN request;

determining whether to admit or reject said new customer VPN request based upon available capacity on paths between said plurality of provider edge routers (PEs) and customer traffic between said customer endpoints and said plurality of provider edge routers;

provisioning edge resources to optimize routing table sizes and backhaul distance upon receiving said new customer VPN request; and computing initial traffic matrix using customer specified peak rate traffic information and available capacity information, wherein said computing initial traffic matrix comprises:

finding a traffic matrix TM(i,j) for traffic from one of said customer endpoints, $CE_j$ to one of said customer endpoints, $CE_j$ using a gravity model and the customer specified peak rate traffic information as inputs, for each customer endpoint traffic source i and traffic sink j, where i<>j, wherein said gravity model is enhanced using an entropy model comprising a penalized least-squares estimation formulation specified as:

$$\text{Min}_x\{\|y-Ax\|^2 + \lambda^2 \Sigma_{\{k: g_k > 0\}} x_k/T \log(x_k/g_k)\}$$

where x represents a vector of traffic matrix variables such that $x_i$ indicates the traffic from source $s_j$ to destination $d_k$, where y represents a vector of link traffic measurements such that $y_i$ indicates the traffic on link i, where A represents a routing matrix indicating which variables $x_i$ sum together to a given $y_i$, where $\lambda$ represents a small real number, where g represents a vector of traffic matrix estimates computed using said Gravity Model, where T represents a total traffic in the network; and initiating PE-PE traffic monitoring for all traffic source and sink pair (ij).

2. An apparatus for performing resource allocation and admission control of Virtual Private Networks (VPNs) in a communications network with a plurality of customer endpoints and a plurality of provider edge routers, comprising:

means for receiving a new customer VPN request;

means for determining whether to admit or reject said new customer VPN request based upon available capacity on paths between said plurality of provider edge routers (PEs) and customer traffic between said customer endpoints and said plurality of provider edge routers;

means for provisioning edge resources to optimize routing table sizes and backhaul distance upon receiving said new customer VPN request; and means for computing initial traffic matrix using customer specified peak rate traffic information and available capacity information, wherein said means for computing initial traffic matrix comprises:

means for finding a traffic matrix TM(i,j) for traffic from one of said customer endpoints, $CE_i$ to one of said customer endpoints, $CE_j$ using a gravity model and the customer specified peak rate traffic information as inputs, for each customer endpoint traffic source i and traffic sink j, where i<>j, wherein said gravity model is enhanced using an entropy model comprising a penalized least-squares estimation formulation specified as:

$$\text{Min}_x\{\|y-Ax\|^2 = \lambda_2 \Sigma_{\{k: g_k > 0\}} x_k/T \log(x_k/g_k)\}$$

where x represents a vector of traffic matrix variables such that $x_i$ indicates the traffic from source $s_j$ to destination $d_k$, where y represents a vector of link traffic measurements such that $y_i$ indicates the traffic on link i, where A represents a routing matrix indicating which variables $x_i$ sum together to a given $y_i$ where $\lambda$ represents a small real number, where g represents a vector of traffic matrix estimates computed using said Gravity Model, where T represents a total traffic in the network; and means for initiating PE-PE traffic monitoring for all traffic source and sink pair (i,j).

* * * * *